(12) United States Patent
Ford et al.

(10) Patent No.: US 8,156,374 B1
(45) Date of Patent: Apr. 10, 2012

(54) PROBLEM MANAGEMENT FOR OUTSIZED QUEUES

(75) Inventors: Terriss Ford, Overland Park, KS (US); Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 271 days.

(21) Appl. No.: 12/507,799

(22) Filed: Jul. 23, 2009

(51) Int. Cl.
    *G06F 11/00* (2006.01)
(52) U.S. Cl. .......................................................... 714/15
(58) Field of Classification Search ............... 714/15, 714/2; 719/314
    See application file for complete search history.

(56) References Cited

U.S. PATENT DOCUMENTS

| | | | | |
|---|---|---|---|---|
| 4,939,724 A | * | 7/1990 | Ebersole | 370/407 |
| 6,993,027 B1 | * | 1/2006 | Kadambi et al. | 370/394 |
| 7,415,632 B1 | * | 8/2008 | Beale et al. | 714/15 |
| 2003/0101461 A1 | * | 5/2003 | Todogawa et al. | 725/105 |
| 2004/0215998 A1 | * | 10/2004 | Buxton et al. | 714/2 |
| 2008/0229329 A1 | * | 9/2008 | Ayres et al. | 719/314 |

* cited by examiner

*Primary Examiner* — Scott Baderman
*Assistant Examiner* — Yair Leibovich

(57) ABSTRACT

A system is provided for problem management for outsized queues. The system includes a computer readable storage medium comprising a management component stored as a set of computer instructions executable by a processor. The management component stops transmission of inbound messages for a queue managed by a first queue manager. The management component provides a copy of the queue to a second queue manager and recreates the queue as an empty queue for the first queue manager. The management component restarts the inbound messages for the recreated queue and enables the second queue manager to manage the copy of the queue. The management component enables an application that retrieved messages from the queue to retrieve messages from at least one of the recreated queue and the copy of the queue and to promote outputting data for a requesting user application to a user interface.

20 Claims, 3 Drawing Sheets

PROBLEM MANAGEMENT FOR OUTSIZED QUEUES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Large business enterprises typically include computer systems that need to be monitored for efficiencies and for other reasons. Examples of such systems are mainframe and personal computer networks, which may include queues for handling message requests. Message queues typically receive, process, and forward requests for information and services. Message queuing is a method of application-to-application communication, such as communication between an application that services a user and an application that retrieves data from a database. Applications may communicate by writing and reading application-specific data, or messages, to and from queues, without having a dedicated synchronous link between the applications. Messaging means that applications communicate with each other by sending discrete amounts of data in messages to some intermediary, and not necessarily by calling each other directly. Queuing implies that applications communicate through queues, which removes the requirement for both the sending application and the receiving application to execute concurrently and/or synchronously. In other words, the sending and receiving of messages is asynchronous; and there is no time dependency between sending and receiving except that which may be imposed by the applications themselves.

SUMMARY OF THE INVENTION

In some embodiments, a system is provided for problem management for outsized queues. The system includes a computer readable storage medium comprising a management component stored as a set of computer instructions executable by a processor. The management component stops transmission of inbound messages for a queue managed by a first queue manager. The management component also provides a copy of the queue to a second queue manager, recreates the queue as an empty queue for the first queue manager. Additionally, the management component restarts the inbound messages for the recreated queue and enables the second queue manager to manage the copy of the queue. Furthermore, the management component enables an application that retrieved messages from the queue to retrieve messages from at least one of the recreated queue and the copy of the queue and to promote outputting data for a requesting user application to a user interface.

In some embodiments, a computer implemented method is provided for problem management for outsized queues. A problem is detected that is associated with a queue managed by a first queue manager. Transmission of inbound messages is stopped for the queue. The first queue manager is stopped. A copy of the queue is provided to a second queue manager. The first queue manager is restarted to recreate the queue as an empty queue for the first queue manager. The inbound messages are restarted for the recreated queue. The second queue manager is enabled to manage the copy of the queue. An application that retrieved messages from the queue is enabled to retrieve messages from at least one of the recreated queue and the copy of the queue and to promote outputting data for a requesting user application to a user interface.

In some embodiments, a system is provided for problem management for outsized queues. The system includes a computer readable storage medium comprising a management component stored as a set of computer instructions executable by a processor. The management component detects a problem associated with a queue managed by a first queue manager and stops transmission of inbound messages for the queue. The management component also provides a copy of the queue to a second queue manager and recreates the queue as an empty queue for the first queue manager. Additionally, the management component restarts the inbound messages for the recreated queue and enables the second queue manager to manage the copy of the queue. Furthermore, the management component identifies a plurality of applications that retrieved messages from the queue and identifies at least one target application of the plurality of applications. Moreover, the management component enable the at least one target application to retrieve messages from the copy of the queue and to promote outputting data for a requesting user application to a user interface.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION OF THE PREFERRED EMBODIMENTS

Figure 1:
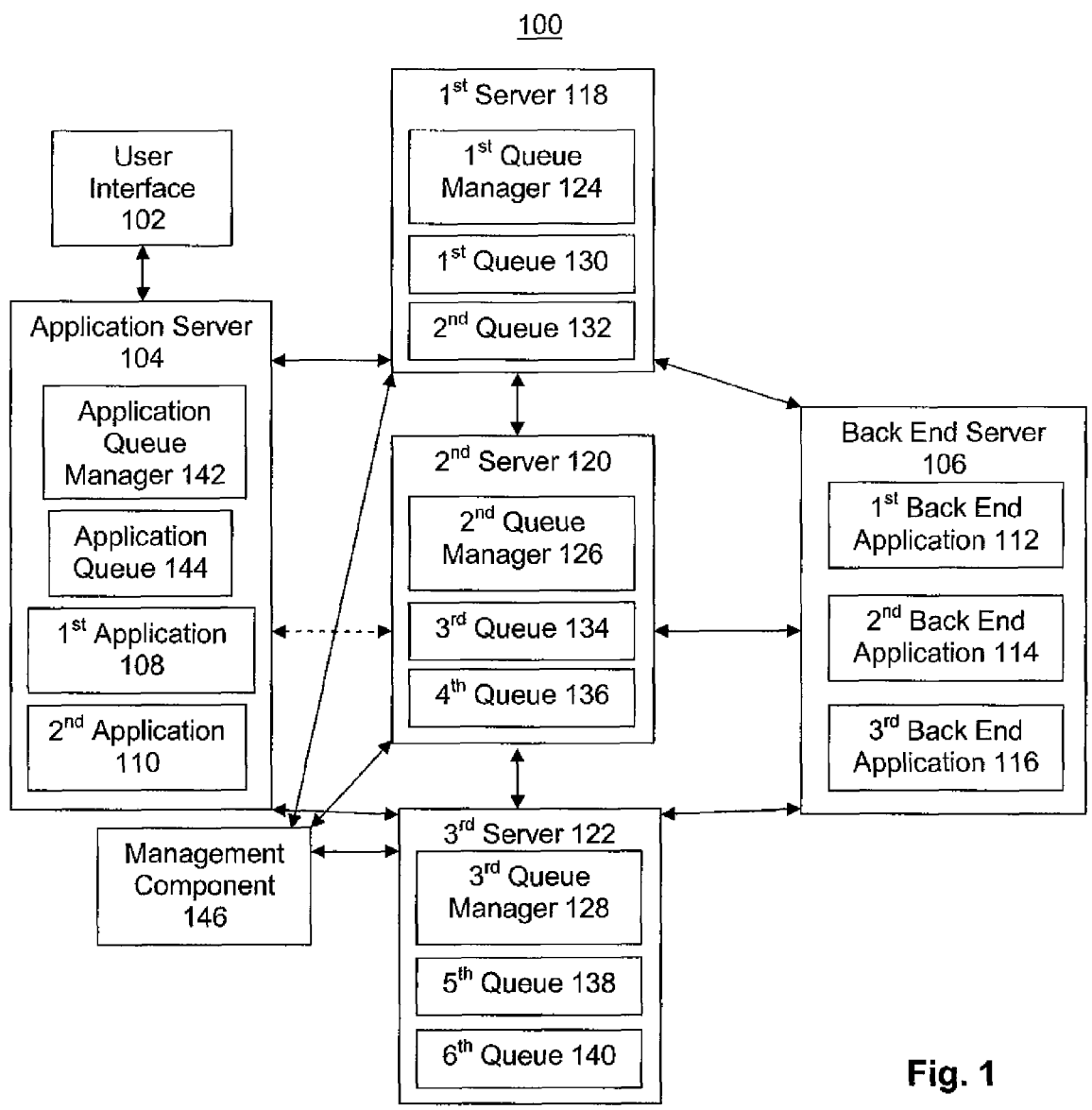
FIG. 1 is a block diagram that depicts a system for problem management for outsized queues according to embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

If a queue in a computer system grows large enough to exceed its maximum size, which may occur, for example, if one of the applications that remove messages from the queue is stopped for maintenance work, the queue may become corrupted. If a queue becomes corrupted, any applications that retrieved messages from the corrupted queue may no longer be able to retrieve messages from the corrupted queue. Furthermore, the queue manager that managed the corrupted queue may stop functioning because of the corrupted queue, such that none of the applications that retrieve messages from any of the queues managed by the queue manager may be able to retrieve their messages from any of the queues. Typically, computer system managers may delete the queue manager, recreate the queue manager and all of its queues, and repair the corrupted queue in an off-line or special environment, such as a technical analyst's work station, in order to recover the corrupted queue's messages. Such a process may require a significant amount of time and effort, such as days or even weeks of work.

In some embodiments, a system is provided for problem management for outsized queues. A management component stops transmission of inbound messages for a queue, either periodically before any problems are detected or if the management component detects a problem for the queue, such as when the queue is close to exceeding its maximum size. Instead of addressing the problems that occur only when a queue becomes corrupted, the management component addresses problems that may occur when a queue becomes significantly large, or outsized, such as excessive time delays, server memory usage that approaches maximum capacity, and excessive numbers of agent processes or channel pool processes. By stopping the inbound messages upon detection of a problem, the management component may be able to address the problem before the problem becomes more significant or before the problem is even detected, such as before an outsized queue becomes corrupted and terminates the operation of the queue manager that was responsible for managing the outsized queue. This stops writing additional messages to the outsized queue. The management component makes a copy of the queue, provides the copy of the queue to a secondary queue manager, and enables the secondary queue manager to manage the copy of the queue. The secondary queue manager may have the time and the resources that the initial queue manager did not have to manage the copy of the queue, thereby avoiding or mitigating the problem.

The management component also recreates the queue as an empty queue for its initial queue manager and restarts the inbound messages for the recreated queue. Recreating the queue as an empty queue may enable the initial queue manager to manage the recreated queue in an environment where no problem exists, such as when the recreated queue starts out so small that it no longer threatens to exceed its maximum queue size. The management component enables an application that retrieved messages from the copied queue to retrieve messages from the recreated queue and/or the copy of the queue, for example, by reconfiguring the application, by sending an appropriate message to the application, or by another process. The application may be able to retrieve messages from the copy of the queue that is managed by the secondary queue manager in an environment that can handle a detected problem. For example, because the copy of the queue is no longer receiving any more incoming messages, the copy of the queue is no longer in danger of exceeding its maximum queue size. The application may also receive messages as the new messages come into the recreated queue. Retrieving messages from one or both of these queues enables the application to function properly. Proper functioning of the application may result in enabling the outputting of data to a user interface for a requesting user application. This management of detected or undetected problems for outsized queues may be conducted in only a few minutes, instead of days or weeks, and avoid problems to provide uninterrupted use of system applications.

Turning now to FIG. 1, a block diagram illustrates a system 100 for problem management for outsized queues according to some embodiments of the present disclosure. The system 100 includes a user interface 102, an application server 104, and a back end server 106. The user interface 102 enables a user of the system 100 to view information requested from the back end server 106 via the application server 104 and/or to control execution of the application server 104. The application server 104 executes applications 108-110 that can request data from back end applications 112-116 executed by the back end server 106.

Messages, such as data request made by the applications 108-110, can travel through a cluster of servers 118-122 before reaching the back end applications 112-116. The cluster of servers 118-122 implement queue managers 124-128 and queues 130-140 that enable the applications 108-110 to communicate with the back end applications 112-116 by message queuing, such that a dedicated synchronous link between the applications 108-110 and the back end applications 112-116 is not required. The queues 130-140 may be for example, IBM MQ Series message queues, Java® Message Service (JMS) queues, or other message services queues known to one of ordinary skill in the art that may be employed.

Each server in the cluster of servers 118-122 may include one or more of the queue managers 124-128 to determine whether messages received are intended for one of the server's queues or intended to be temporarily stored and subsequently forwarded to another server's queues. For example, a first server 118 includes a first queue manager 124, a second server 120 includes a second queue manager 126, and a third server 122 includes a third queue manager 128. Each of the queue managers 124-128 may manage a transmission queue and a local queue, an inbound queue and an outbound queue, or any other types of queues. For example, the first queue manager 124 may manage a first queue 130 and a second queue 132, the second queue manager 126 may manage a third queue 134 and a fourth queue 136, and the third queue manager 128 may manage a fifth queue 138 and a sixth queue 140. The queue managers 124-128 may be located separately on the servers 118-122, or any combination of the queue managers 124-128 may be located on any of the servers 118-122. Furthermore, the queues 130-140 may be located in separate pairs on the servers 118-122, in any combination on any of the servers 118-122, or on other servers which are not pictured.

The application server 104 has an application queue manager 142 that manages an application queue 144 and determines where a message will be initially sent to communicate with the back end applications 112-116. For example, the application queue manager 142 sends a first message from the application queue 144 for the first application 108 to the first queue 130, which may be referred to as the first transmission queue 130. The first queue manager 124 may evaluate messages received on the first transmission queue 130, and determines whether each message can be serviced locally by the second queue 132, which may be referred to as the first local queue 132, or needs to be forwarded to another queue. In this example, the first queue manager 124 takes the first message from the first transmission queue 130 and puts the first message on the first local queue 132, which makes the message directly available to the first back end application 112. Subsequently, the first back end application 112 may check the first local queue 132 for messages that can be serviced locally, and provide the data requested by the message. After the first back end application 112 provides the data requested by the message, the first queue manager 124 may transfer the message from the first local queue 132 back to the first transmission queue 130. The first transmission queue 130 may return the message with the requested data back to the application queue 144 for the first application 108.

In another example, the application queue manager 142 may send a second message from the application queue 144 for the second application 110 to the first transmission queue 130. If the first queue manager 124 determines that the message cannot be serviced locally by the first local queue 132, the first queue manager 124 may forward the message in the first transmission queue 130 to another queue. The first queue manager 124 may forward the message to a transmission queue associated with a local queue that directly services the message or to a transmission queue that forwards the message on to yet another transmission queue. The local queue that directly services the message may be referred to the destination queue for the message. Continuing this example, the first queue manager 124 may forward the message to the third queue 134, which may be referred to as the second transmission queue 134.

The second queue manager 126 evaluates messages received on the second transmission queue 134, and determines whether each message can be serviced locally by the fourth queue 136, which may be referred to as the second local queue 136, or needs to be forwarded to another transmission queue. If the second queue manager 126 determines that the message can be serviced locally by the second local queue 136, the second queue manager 126 transfers the message from the second transmission queue 134 to the second local queue 136. If the second local queue 136 is a queue that is serviced by the second back end application 114, the second local queue 136 may be the destination queue for the message. Subsequently, the second back end application 114 may check the second local queue 136 for messages that can be serviced locally, and provides the data requested by the message. After the second back end application 114 provides the data requested by the message, the second queue manager 126 may transfer the message with the data from the second local queue 136 back to the second transmission queue 134. The second transmission queue 134 then returns the message with the requested data back to the application queue 144 for the second application 110.

The application queue manager 142 may monitor the sequence in which the application queue manager 142 sends messages to the servers 118-122, and use this sequence to load balance and distribute the messages appropriately between the servers 118-122 over time. The application queue manager 142 may perform other functions well known to one skilled in the art.

The system 100 also includes a management component 146, which manages problems for outsized queues. Although depicted as separate from the servers 104-106 and 118-122, the management component 146 can be executed anywhere in the system 100. The numbers of user interfaces, management components, application servers, clustered servers, back end servers, queue managers, and queues in the system 100 are depicted in FIG. 1 for the purpose of an illustrative example, as the system 100 can include any number of user interfaces, management components, application servers, clustered servers, back end servers, queue managers, and queues.

The management component 146 may detect a problem for a queue, such as the second queue 132, which may be referred to as the first local queue 132. Examples of detected problems include when a queue is close to exceeding its maximum size, for example, of two gigabytes, when a queue's throughput has decreased significantly or is decreasing significantly, when the memory usage for the processor that executes the queue's queue manager approaches the available memory capacity, when the number of agent processes for the queue's queue manager has increased significantly or is increasing significantly, and when the number of channel pool processes for the queue's queue manager has increased significantly or is increasing significantly. The problem may be associated with one or many of the queues 130-132 managed by the first queue manager 124. For example, if the memory usage for the first server 118 is approaching its available memory capacity, the management component 146 may detect a problem for all of the queues 130-132.

In response to detecting a problem or periodically in anticipation of detecting a problem, the management component 146 stops transmission of inbound messages for the queues associated with the problem, such as the queue 132, which may be an inbound queue, an outbound queue, a transmission queue, or a local queue. The management component 146 may stop transmission of inbound messages for the queues on a periodic basis in anticipation of detecting problems, such as on an hourly basis or a daily basis. By stopping the inbound messages upon the detection or the anticipation of detecting the problem, the management component 146 may be able to address the problem before the impact of the problem becomes more significant or before a potential problem is even detected, such as before an outsized queue 132 becomes corrupted and/or terminates the operation of the first queue manager 124.

The management component 146 may stop the first queue manager 124 to ensure that in addition to the second queue 132 no longer accepting inbound messages, that the first queue manager 124 no longer enables any of the back end applications 112-116 to retrieve messages from the second queue 132. By stopping the first queue manager 124, the management component 146 may establish a version of the queue 132 that no longer changes, such that a copy made of the second queue 132 will include all of the messages that another queue manager needs to process and only the messages that another queue manager needs to process. When messages are no longer accepted by a queue in a queue messaging system, the queues that previously provided the messages for the queue retain the messages for subsequently sending to the queue. For example, when the management component 146 stops the receipt of messages by the queue 132, the application queue 144 retains the messages intended for the queue 132 until the management component 146 enables the queue 132 to receive messages again. The application queue 144 may need to retain the messages for the queue 132 for only a few minutes before the management component 146 recreates the queue 132 as the empty queue 132 and restarts receipt of messages for the recreated queue 132.

The management component 146 may determine whether the queue 132 is corrupted. If the queue 132, which may be stored as a file, is corrupted, the management component 146 may repair the queue 132 and recover the messages on the queue 132. Repairing the queue 132 may be a relatively simple process for the management component 146 to conduct, or the management component 146 may require that a copy of the queue 132 is provided to queue repair specialists to repair the queue 132.

The management component 146 may make a copy of the queue 132 and provide the copy of the queue 132 to the second queue manager 126. Once a copy of the queue 132 is provided to another queue manager, the management component 146 may delete the queue 132. Deleting the queue 132 may assist in the process of subsequently recreating the queue 132 as the empty queue 132.

The management component 146 may restart the first queue manager 124 to recreate the queue 132 as the empty queue 132 based on validating a log for the first queue manager 124. The first queue manager 124 may maintain a log of messages that identifies the queues 130-132 managed by the first queue manager 124. Validating the log for the first queue manager 124 may determine which queues 130-132 are needed by the first queue manager 124 and identify the deletion of any of the queues 130-132 needed by the first queue manager 124, such as the deleted queue 132. Having identified that the queue 132 is needed but has been deleted, the first queue manager 124 recreates the queue 132 as the empty queue 132.

The management component 146 may restart the inbound messages for the recreated queue 132. Recreating the queue 132 as the empty queue 132 and restarting the inbound messages for the recreated queue 132 may enable the first queue manager 124 to manage the recreated queue 132 in an environment where no problem exists, such as when the recreated queue 132 starts out so small that it no longer threatens to exceed the maximum queue size.

The management component 146 may enable the second queue manager 126 to manage the copy of the queue 132. The management component 146 may provide the copy of the queue 132 to any of the queue managers 126-128 because the copy of the queue 132 has the attributes for the queue 132 that enable the copy of the queue 132 to be managed as if the copy of the queue 132 is actually the queue 132. Therefore, the management component 146 does not have to instruct any of the queue managers 126-128 to manage the copy of the queue 132 as the queue 132 because any of the queue managers 126-128 obtain any information needed for managing the copy of the queue 132 from the copy of the queue 132. The second queue manager 126 may have the time and the resources that the first queue manager 124 did not have to manage the copy of the queue 132, thereby avoiding or mitigating the problem. For example, the first queue manager 124 may manage multiple queues 130-132 for multiple back end applications 112-116, however, the second queue manager 126 may manage only the copy of the queue 132 for only the second back end application 114.

The management component 146 may enable the second queue manager 126 to manage the copy of the queue 132 following a troubleshooting delay period. For example, if the management component 146 detected a problem for the queue 132 because the second back end application 114 was stopped for maintenance work and no longer retrieving messages from the queue 132, the management component 146 may enable the second queue manager 126 to manage the copy of the queue 132 after the maintenance work is completed and the second back end application 114 is restarted.

The second queue manager 126 may be inactive prior to being enabled to manage the copy of the queue 132. For example, the second server 120 may be a back-up server 120 that is allocated for managing problems for outsized queues, such that the second queue manager 126 is inactive and not receiving any messages for its queues 134-136 while it waits to be assigned a copy of a queue by the management component 146. In this example, the third queue 134 may be a placeholder that awaits the copy of the queue 132. Allocating the second server 120 and/or the second queue manager 126 for only managing problems with outsized queues may expedite the process of providing a copy of an outsized queue to the second queue manager 126 because the second queue manager 126 does not have to be stopped and restarted to enable management of the copy of the outsized queue.

The management component 146 may identify which of the back end applications 112-116 retrieved messages from the queue 132. For example, only the second back end application 114 may have retrieved messages from the queue 138. The management component 146 may identify at least one target application of the back end applications 112-116. For example, all of the back end applications 112-116 may have retrieved messages from the queue 132, but the first and third back end applications 112 and 116 may have continued retrieving messages from the queue 132 while the second back end application 114 stopped retrieving messages from the queue 132 when the second back end application 114 was stopped for maintenance work. In this example, the second back end application 114 is a target application because nearly all of the messages on the queue 132 are for the second back end application 114 and not for the first and third back end applications 112 and 116.

Therefore, the first and third back end applications 112 and 116 may best process their messages by retrieving messages from the recreated queue 132 managed by the first queue manager 124. In contrast, the second back end application 114 may best process its messages by retrieving messages from the copy of the queue 132 managed by the second queue manager 126 as the queue 134 until the backlog of messages in the copy of the queue 132 have been retrieved. Once the backlog of messages have been retrieved from the queue 134 that has the copy of the queue 132, the management component 146 may enable each target application, such as the second back end application 114, to retrieve messages from the recreated queue 132. Alternatively, the management component 146 may enable each target application, such as the second back end application 114, to retrieve messages from the recreated queue 132 while retrieving messages from the queue 134 that has the copy of the queue 132 so that the target application may retrieve both backlogged messages and new incoming messages. The management component 146 may initially enable the first and third back end applications 112 and 116 to retrieve messages from the queue 134 that has the copy of the queue 132 managed by the second queue manager 126 until the few messages on the queue 134 that has the copy of the queue 132 for the first and third back end applications 112 and 116 are retrieved.

The management component 146 may restart the second back end application 114 to enable the second back end application 114 to read from and/or write to the recreated queue 138 and/or the copy of the queue 138. Being enabled to read from and write to the recreated queue 132 and the queue 134 that has the copy of the queue 132 enables the second back end application 114 to retrieve messages from the recreated queue 132 and the queue 134 that has the copy of the queue 132. The second back end application 114 may be able to retrieve messages from the queue 134 that has the copy of the queue 132 that is managed by the second queue manager 126 in an environment that can handle the detected problem. For example, because the queue 134 that has the copy of the queue 132 is no longer receiving any more incoming messages, the queue 134 that has the copy of the queue 132 is no longer in danger of exceeding its maximum queue size. The second back end application 114 may also receive messages as the new messages come into the recreated queue 132. If the second back end application 114 is initially enabled to retrieve messages from only the queue 134 that has the copy of the queue 132 managed by the second queue manager 126, when all of the messages have been retrieved from the queue 134 that has the copy of the queue 132, the management component 146 may enable the second back end application 114 to retrieve messages from the recreated queue 132 instead of from the queue 134 that has the copy of the queue 132.

Retrieving messages from the recreated queue 132 and/or the queue 134 that has the copy of the queue 132 may enable the second back end application 114 to function properly. Proper functioning of the second back end application 114 may result in enabling the outputting of data to the user interface 102 for the requesting second application 110. This management of problems for outsized queues may be conducted in only a few minutes, instead of days or weeks, and avoid problems to provide uninterrupted use of system applications. An inordinately large queue often may be only a symptom of an underlying problem. Copying the queue 132 and shifting inbound messages to the copy of the queue 132 may provide sufficient time to identify the underlying problem before the recreated queue 132 is overloaded. The act of copying the queue 132 and shifting inbound messages to the copy of the queue 132 reduces stress on the system 100 and enables the restart of the first queue manager 124.

Figure 2:
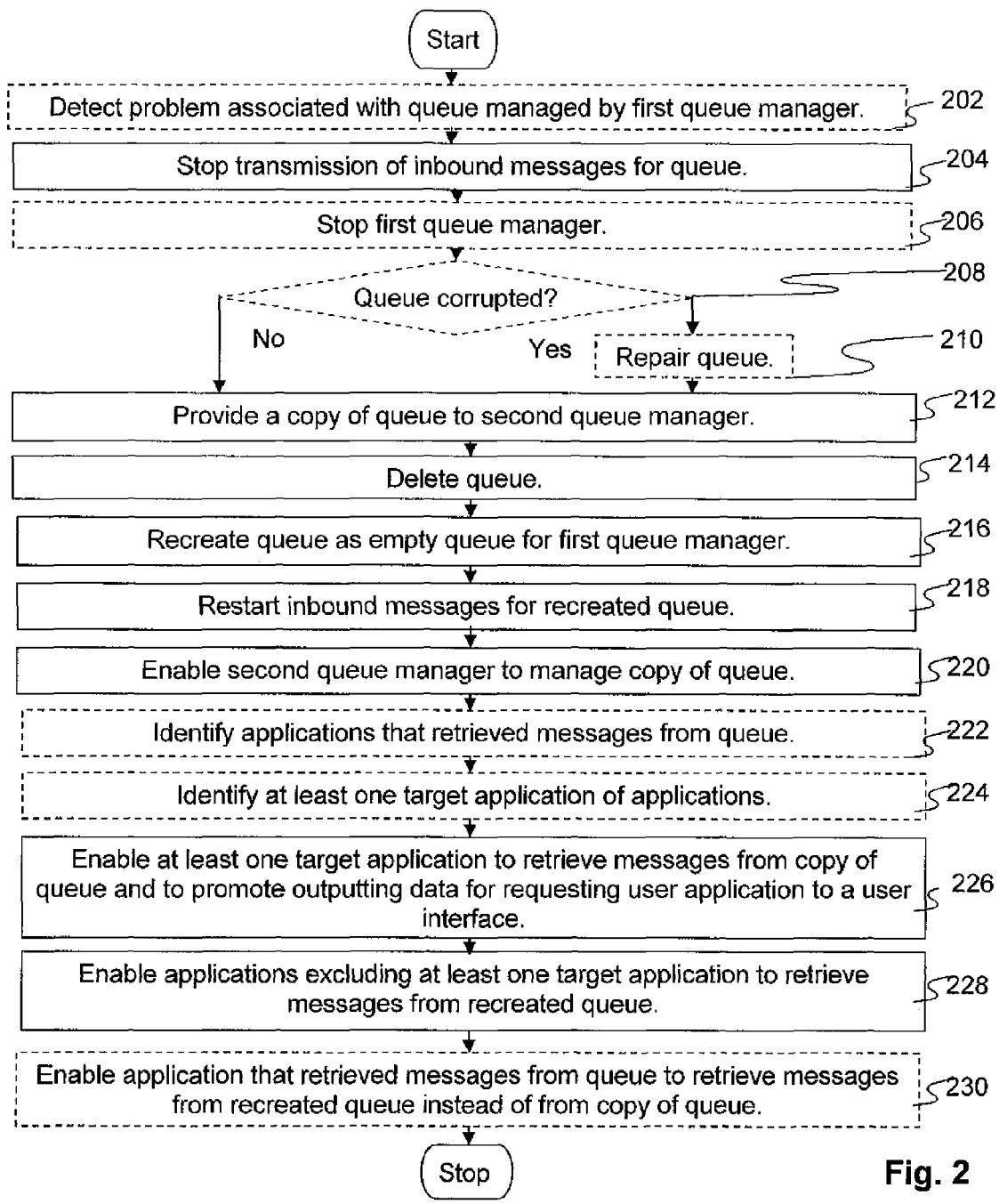
FIG. 2 is a flowchart that depicts a method for problem management for outsized queues according to embodiments of the present disclosure.

Turning now to FIG. 2, a flowchart illustrates a method 200 for problem management for outsized queues according to embodiments of the present disclosure. Executing the method 200 enables problems with outsized queues to be managed before the impact of the problems increase in significance or before the problems are detected.

In box 202, a problem is optionally detected that is associated with a queue managed by a first queue manager. For example, the management component 146 detects that the queue 132 is approaching its maximum capacity. Examples of other detectable problems include excessive time delays, server memory usage that approaches maximum capacity, and excessive numbers of agent processes or channel pool processes. The management component 146 may execute portions of the method 200 periodically in anticipation of a problem without detecting the problem.

In box 204, transmission of inbound messages is stopped for a queue. For example, the management component 146 stops the transmission of messages for the queue 132.

In box 206, a first queue manager is optionally stopped. For example, the management component 146 stops the first queue manager 124.

In box 208, a determination is optionally made whether a queue is corrupted. For example, the management component 146 determines whether the queue 132 is corrupted. If the queue 132 is corrupted, the method continues to box 210. If the queue 132 is not corrupted, the method proceeds to box 212.

In box 210, a queue is optionally repaired. For example, the management component 146 repairs the queue 132.

In box 212, a copy of a queue is provided to a second queue manager. For example, the management component 146 provides a copy of the queue 132 to the second queue manager 126.

In box 214, a queue is deleted. For example, the management component 146 deletes the queue 132.

In box 216, a queue is recreated as an empty queue for a first queue manager. For example, the management component 146 recreates the queue 132 as the empty queue 132 for the first queue manager 124.

In box 218, inbound messages are restarted for a recreated queue. For example, the management component 146 restarts inbound messages for the recreated queue 132.

In box 220, a second queue manager is enabled to manage a copy of a queue. For example, the management component 146 enables the second queue manager 126 to manage the copy of the queue 132.

In box 222, applications that retrieved messages from a queue are optionally identified. For example, the management component 146 identifies which of the back end applications 112-116 retrieved messages from the queue 132.

In box 224, at least one target application of the applications is optionally identified. For example, the management component 146 identifies the second back end application 114 as a target application.

In box 226, at least one target application is enabled to retrieve messages from a copy of a queue and to promote outputting data for a requesting user application to a user interface. For example, the management component 146 enables the second back end application 114 to retrieve messages from the copy of the queue 132 and to promote outputting data for the requesting second application 110 to the user interface 102.

In box 228, applications excluding at least one target application are enabled to retrieve messages from a recreated queue. For example, the management component 146 enables the first and third back end applications 112 and 116 to retrieve messages from the recreated queue 132.

In box 230, an application that retrieved messages from a queue is optionally enabled to retrieve messages from a recreated queue instead of from a copy of a queue. For example, once the backlog of messages have been retrieved from the copy of the queue 132, the management component 146 enables the second back end application 114 to retrieve messages from the recreated queue 132 instead of from the copy of the queue 132.

Figure 3:
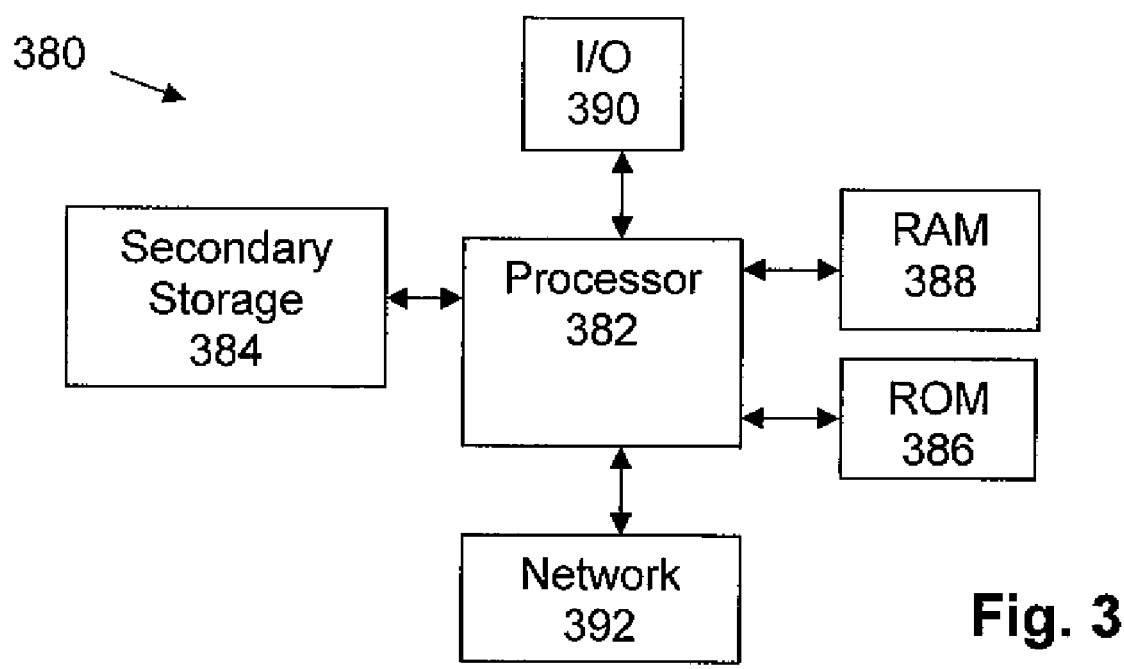
FIG. 3 illustrates an exemplary purpose computer system suitable for implementing the several embodiments of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for problem management for outsized queues, comprising:
    a computer readable storage medium comprising a management component stored as a set of computer instructions executable by a processor to:
        stop transmission of inbound messages for a queue managed by a first queue manager prior to the queue becoming corrupted,
        subsequently make and provide a copy of the queue to a second queue manager,
        subsequently recreate the queue as an empty queue for the first queue manager,
        subsequently restart the inbound messages for the recreated queue,
        subsequently enable the second queue manager to manage the copy of the queue, and
        subsequently enable an application that retrieved messages from the queue to retrieve messages from at least one of the recreated queue and the copy of the queue and to promote outputting data for a requesting user application to a user interface.

2. The system of claim 1, wherein the management component further detects a problem associated with a queue, wherein the problem is based on at least one of a size of the queue, a throughput issue associated with the queue, a memory usage associated with a processor that executes the first queue manager, a number of agent processes associated with the first queue manager, and a number of channel pool processes associated with the first queue manager.

3. The system of claim 1, wherein the queue is one of an inbound queue, an outbound queue, a local queue, and a transmission queue.

4. The system of claim 1, wherein the management component stops transmission of inbound messages for the queue on a periodic basis.

5. The system of claim 1, wherein the management component further:
    determines whether the queue is corrupted, and
    repairs the queue in response to a determination that the queue is corrupted.

6. The system of claim 1, wherein the management component further deletes the queue.

7. The system of claim 6, wherein the second queue manager is inactive prior to being enabled to manage the copy of the queue.

8. The system of claim 1, wherein the management component enables the second queue manager to manage the copy of the queue following a troubleshooting delay period.

9. The system of claim 1, wherein the management component further enables the application that retrieved messages from the queue to retrieve messages from the recreated queue instead of from the copy of the queue.

10. A computer implemented method for problem management for outsized queues,
comprising:
   detecting a problem associated with a queue managed by a first queue manager;
   subsequently stopping transmission of inbound messages for the queue;
   subsequently stopping the first queue manager prior to the queue becoming corrupted;
   subsequently making and providing a copy of the queue to a second queue manager;
   subsequently restarting the first queue manager to recreate the queue as an empty queue for the first queue manager;
   subsequently restarting the inbound messages for the recreated queue;
   subsequently enabling the second queue manager to manage the copy of the queue; and
   subsequently enabling an application that retrieved messages from the queue to retrieve messages from at least one of the recreated queue and the copy of the queue and to promote outputting data for a requesting user application to a user interface.

11. The computer implemented method of claim 10, wherein recreating the queue as the empty queue for the first queue manager is based on validating a log for the first queue manager.

12. The computer implemented method of claim 11, wherein validating the log for the first queue manager comprises determining queues that are needed for the first queue manager and identifying a deletion of the queue, wherein the queues that are needed for the first queue manager comprises the queue.

13. The computer implemented method of claim 10, wherein enabling the application that retrieved messages from the queue to retrieve messages from at least one of the recreated queue and the copy of the queue comprises restarting the application.

14. The computer implemented method of claim 10, wherein enabling the application that retrieved messages from the queue to retrieve messages from at least one of the recreated queue and the copy of the queue comprises enabling the application to at least one of read from and write to the at least one of the recreated queue and the copy of the queue.

15. A system for problem management for outsized queues, comprising:
   a computer readable storage medium comprising a management component stored as a set of computer instructions sequentially executable by a processor to:
      detect a problem associated with a queue managed by a first queue manager,
      stop transmission of inbound messages for the queue prior to the queue becoming corrupted,
      provide a copy of the queue to a second queue manager,
      recreate the queue as an empty queue for the first queue manager,
      restart the inbound messages for the recreated queue,
      enable the second queue manager to manage the copy of the queue,
      identify a plurality of applications that retrieved messages from the queue,
      identify at least one target application of the plurality of applications, and
      enable the at least one target application to retrieve messages from the copy of the queue and to promote outputting data for a requesting user application to a user interface.

16. The system of claim 15, wherein the problem is associated with a plurality of queues managed by the first queue manager that comprise the queue.

17. The system of claim 16, wherein the management component further promotes the second queue manager managing the plurality of queues.

18. The system of claim 15, wherein the management component further enables the plurality of applications excluding the at least one target application to retrieve messages from the recreated queue.

19. The system of claim 18, wherein the management component further enables the plurality of applications excluding the at least one target application to retrieve messages from the copy of the queue.

20. The system of claim 15, wherein the management component further enables the at least one target application to retrieve messages from the recreated queue.

* * * * *